United States Patent Office 3,211,609
Patented Oct. 12, 1965

3,211,609
ANTICOCCIDIAL COMPOSITIONS AND METHOD OF USING SAME
Edward Franklin Rogers, Middletown, and Robert L. Clark, Woodbridge, N.J., assignors to Merck & Co., Inc., Rahway, N.J., a corporation of New Jersey
No Drawing. Filed Sept. 29, 1961, Ser. No. 141,585
10 Claims. (Cl. 167—53.1)

This invention relates to novel compositions useful in the treatment and prevention of the poultry disease coccidiosis. Still more specifically, it is concerned with animal feeds and feed supplements containing as an active anticoccidial agent certain tertiaryaminoalkyl esters of 2-loweralkoxy-4-amino benzoic acid and 2-loweralkenyloxy-4-amino benzoic acid compounds.

Coccidiosis is a common and widespread poultry disease caused by species of protozoan parasites of the genus Eimeria. The more important of these species are *E. maxima, E. acervulina, E. tenella, E. necatrix, E. brunetti, E. praecox* and *E. mitis.* In turkeys, *E. meleagridis* and *E. adenoides* are also causative organisms of coccidiosis. When left untreated, the severe forms of the disease lead to poor weight gain, reduced feed efficiency and high mortality. For these reasons, the successful control of coccidiosis is highly important to the poultry industry.

According to the present invention, certain organic compounds have been found to be highly effective in the treatment and prevention of coccidiosis, and particularly to coccidiosis due to the protozoan parasites *E. maxima, E. mitis, E. acervulina* and *E. brunetti.* One object of the invention, therefore, is to provide novel compositions containing such compounds. Another object is provision of animal feeds and feed supplements containing such compounds as active anticoccidial agents. A still further object is provision of a new method of controlling coccidiosis by administration of these compounds to poultry. Other objects will become evident from the following discussion of the invention.

It has now been found that substances having the structural formula

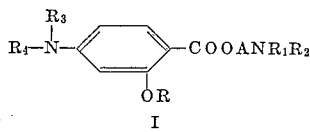

I and acid addition salts thereof, possess significant anticoccidial activity. In the above formula, A is a lower alkylene radical having its two free valence bonds on different carbon atoms. In the preferred compounds, A is a straight chain alkylene radical such as ethylene, propylene or butylene, i.e. of 2–4 carbon atoms, but it may also be a branched chain moiety such as isopropylene;

R is a lower alkyl or lower alkenyl group, examples of which are methyl, ethyl, propyl, butyl, allyl or methallyl radicals;

the tertiaryamino radical, $-NR_1R_2$, is preferably a diloweralkylamino substituent such as dimethylamino, diethylamino, dibutylamino, methyl-ethylamino or methyl-propylamino. Alternatively, $-NR_1R_2$ may represent a monocyclic nitrogen-containing heterocycle including the piperidyl, morpholinyl and pyrrolidyl rings;

$R_3$ and $R_4$ represent hydrogen, lower alkyl or acyl, and may be the same or different. Examples of suitable alkyl and acyl radicals are methyl, ethyl, n-butyl, acetyl, propionoyl, formyl, butyroyl, benzoyl and p-halobenzoyl.

The basic esters of Formula I where A, R and $-NR_1R_2$ are as above defined and where $R_3$ and $R_4$ are hydrogen or lower alkyl may be prepared by the methods set forth in the literature. The acyl compounds wherein $R_3$ and/or $R_4$ represent acyl radicals are obtained by treatment of the loweralkylaminoalkyl-2-OR-4-amino benzoate with a suitable acylating agent. It is convenient to employ an acyl halide such as acetyl chloride, benzoyl chloride, propionyl bromide, acetyl bromide and the like as acylating agents.

The tertiaryaminoalkyl esters of Formula I are conveniently synthesized as either the free base or in the form of an acid salt. The acid addition salts are, as a general rule, more highly crystalline than the free bases and for this reason are preferred over the base for incorporation in animal feeds and feed supplements. Any acid salt may be employed in the coccidiostat compositions of the invention. Although any toxic or undesirable effect due to the nature of the acid salt is not a serious problem in view of the very small amounts of these substances that are fed to poultry, it is preferred to utilize a non-toxic acid addition salt such as a hydrochloride, hydrobromide, sulfate, nitrate, phosphate, acetate, citrate or the like.

In accordance with the present invention, the loweralkylaminoalkyl-2-OR-4-amino benzoates of Formula I are effectively employed for the prevention and treatment of poultry coccidiosis by administering them to poultry susceptible to or infected with coccidia. This is normally accomplished by including the coccidiostats in the feed or the drinking water of the birds. In terms of the total feed or liquid intake of the poultry, only very minor amounts of coccidiostat are necessary for satisfactory control of the coccidial infection.

The amount of loweralkylaminoalkyl-2-loweralkoxy-4-amino benzoate or loweralkylaminoalkyl-2-loweralkenyloxy-4-amino benzoate that is required for prevention of coccidiosis in poultry varies to some degree depending upon the specific compound used and the severity of the coccidial infection. With the preferred compounds of this invention, namely diloweralkylaminoalkyl-2-ethoxy-4-amino benzoates and diloweralkylaminoalkyl-2-ethoxy-4-acylamino benzoates, excellent results are obtained by administering a finished feed containing from about 0.0002% to about 0.003% by weight of drug. Because of the variation in the degree and severity of infections it is preferred, however, to administer the compounds at levels of from about 0.0004% to about 0.008% by weight in the feedstuff. In some instances, it may be desirable to employ levels of up to about 0.05% by weight of the feed although these higher dosages are not generally used for prophylactic treatment where the medicated feed is given continuously to the poultry but are of value in treating an established outbreak of coccidiosis. It will be appreciated by those skilled in this art that the lowest levels consonant with fully adequate control of coccidiosis and the development of immunity will be employed in most instances in order to eliminate as far as possible any risk of side effects that might be induced on prolonged feeding of unnecessarily high levels of these coccidiostats. The finished feed in which the above-discussed levels of coccidiostat are employed is a nutritionally adequate one containing sources of carbohydrate, protein, fat, vitamins, minerals and other nutritional factors commonly employed in commercial poultry raising.

In addition to administration via the solid feedstuff, the loweralkylaminoalkyl esters described herein may be administered to poultry by way of the drinking water. The preferred dose levels in the drinking water are usually somewhat less than those employed in a solid feed inasmuch as poultry drink about twice as much as they eat. Administration of these anticoccidial substances via the drinking water is of advantage when using the compounds therapeutically. It is convenient to prepare dispersible or water-soluble powders in which the coccidiostat is intimately dispersed in a suitable carrier such as dextrose or sucrose at concentrations of from about 0.3% to about 25% by weight. These solids may then be conveniently added to the drinking water by the poultry grower.

In addition to poultry feeds containing a minor amount of a compound of Formula I as an effective anticoccidial agent, there are provided in accordance with an additional aspect of this invention poultry feed supplement compositions wherein the loweralkylaminoalkyl-2-substituted-4-amino benzoate, or an acylamino or alkylamino derivative thereof, is intimately dispersed in or admixed with a suitable non-toxic diluent or carrier. The carrier vehicle employed in these supplement compositions should be one in which the coccidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 0.25% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 0.5% to about 5% by weight of active ingredient are preferred.

The diluents normally employed for these poultry feed supplements are solid orally ingestible poultry feed additives such as distiller's dried grains, corn meal, citrus meal, fermentation residues, ground oyster shells, Attapulgus clay, wheat middlings, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. In the present invention, it is preferred, although not essential, that the carrier be a cereal or vegetable substance.

Typical feed supplements containing a compound of Formula I are the following:

| A | Lbs. |
|---|---|
| Diethylaminoethyl-2-ethoxy-4-amino benzoate | 2.5 |
| Corn germ meal | 45.0 |
| Corn distillers' grains | 52.5 |

| B | |
|---|---|
| Diethylaminopropyl-2-ethoxy-4-amino benzoate | 0.1 |
| Wheat middlings | 50.0 |
| Soybean meal | 49.9 |

| C | |
|---|---|
| Diethylaminopropyl-2-ethoxy-4-benzamido benzoate | 0.5 |
| Corn distillers' dried grains | 99.5 |

| D | |
|---|---|
| Dimethylaminopropyl-2-methoxy-4-acetamido benzoate | 0.75 |
| Amprolium | 25.0 |
| Corn gluten feed | 74.25 |

| E | |
|---|---|
| Dimethylaminoethyl-2-ethoxy-methylamino benzoate | 10.0 |
| Soya grits | 60.0 |
| Toasted dehulled soya flour | 30.0 |

The loweralkylaminoalkyl-2-loweralkoxy-4-amino benzoates and the loweralkylaminoalkyl-2-loweralkenyloxy-4-amino benzoates, and the alkylamino and acylamino derivatives thereof, which have been found to be highly active coccidiostat compounds in accordance with this invention, may be employed as the sole coccidiostat being administered to poultry. However, these substances are primarily effective against the *E. maxima* and *E. brunetti* species of coccidia and are less effective than many other coccidiostats against *E. tenella* and *E. necatrix*. For this reason, it is preferred embodiment of the invention to administer the coccidiostats of Formula I above together with one or more other anticoccidial agents which are highly effective against *E. tenella* and *E. necatrix*. Examples of such other coccidiostats are amprolium, nicarbazin, glycarbylamide, 3,5-dinitrobenzamide and 2-methyl-3,5-dinitrobenzamide. Thus, one of the purposes of this invention is to provide highly active broad spectrum anticoccidial compositions which comprise a compound of Formula I and at least one other anticoccidial agent. In many cases the efficacy of such a combination is greater than would be expected from the activity of either coccidiostat alone.

The following examples are given for the purpose of illustration and not by way of limitation:

Example 1

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 100,000 sporulated oocysts of *Eimeria maxima*. On the sixth day after inoculation all surving birds were sacrificed and weighed. The small intestines were pooled in water and homogenized in a blender. Two aliquots of the homogenate were examined for oocysts in a hemocytometer. If the total count of oocysts was less than 30, the compound was rated as active.

The activity of representative compounds of the invention is set forth below, the dose level being the minimum level at which the compound was active:

| Compound: | Dose level (percent by wt. in feed) |
|---|---|
| Diethylaminoethyl-2-ethoxy-4-amino benzoate, phosphate salt | 0.00025 |
| Diethylaminopropyl-2-ethoxy-4-amino benzoate, hydrochloride salt | 0.00025 |
| Dimethylaminoethyl-2-methoxy-4-amino benzoate, hydrochloride salt | 0.005 |
| Dimethylaminopropyl-2-methoxy-4-amino benzoate, hydrochloride salt | 0.001 |

Example 2

A solution of 3.31 g. of diethylaminopropyl-2-ethoxy-4-amino benzoate hydrochloride in 25 ml. of water is neutralized with 4 ml. of 2.5 N sodium hydroxide solution. To this neutralized solution there are added, simultaneously and with vigorous stirring, a solution of 1.4 g. of benzoyl chloride in 10 ml. of ether, and a solution of 4 ml. of 2.5 N sodium hydroxide. After mixing is complete, diethylaminopropyl-2-ethoxy-4-benzamido benzoate precipitates. The solid is recovered by filtration and purified by crystallization from aqueous ethanol.

Other 4-acylamino compounds are obtained from the corresponding dialkylaminoalkyl-2-loweralkoxy-4-amino benzoate by the above procedure, utilizing an acyl chloride corresponding to the desired acylamino compound. Thus, replacement of the benzoyl chloride in the above example with acetyl chloride yields diethylaminopropyl-2-ethoxy-4-acetamido benzoate.

Any departure from the above description which conforms to the present invention is intended to be included within the scope of the claims.

What is claimed is:

1. An anticoccidial composition that comprises a poultry feed having dispersed therein a member of the class consisting of a compound of the formula

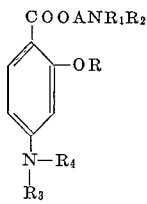

where R is selected from the class consisting of lower alkyl and lower alkenyl, A is lower alkylene, —$NR_1R_2$ is selected from the class consisting of diloweralkylamino, 1-piperidyl, 1-pyrrolidyl and 4-morpholinyl, $R_3$ and $R_4$ are selected from the class consisting of hydrogen, lower alkyl, lower alkanoyl, benzoyl and p-halobenzoyl, and non-toxic acid addition salts thereof.

2. An anticoccidial composition that comprises a poultry feed having dispersed therein at least about 0.0001% by weight of a member of the class consisting of a compound of the formula

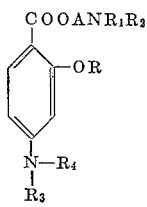

where R is selected from the class consisting of lower alkyl and lower alkenyl, A is lower alkylene, —$NR_1R_2$ is selected from the class consisting of diloweralkylamino, 1-piperidyl, 1-pyrrolidyl and 4-morpholinyl, $R_3$ and $R_4$ are selected from the class consisting of hydrogen, lower alkyl, lower alkanoyl, benzoyl and p-halobenzoyl, and non-toxic acid addition salts thereof.

3. An anticoccidial composition that comprises a poultry feedstuff having dispersed therein at least about 0.0002% by weight of tertiaryaminoloweralkyl-4-loweralkylamino-2-loweralkoxy benzoate.

4. An anticoccidial composition that comprises a poultry feedstuff having dispersed therein at least about 0.0002% by weight of tertiaryaminoloweralkyl-4-loweralkanoylamino-2-loweralkoxy benzoate.

5. An anticoccidial composition that comprises a poultry feedstuff having dispersed therein at least about 0.0002% by weight of tertiaryaminoloweralkyl-4-amino-2-loweralkoxy benzoate.

6. An anticoccidial composition comprising a poultry feed having distributed therein an anticoccidial amount of a non-toxic acid addition salt of diethylaminoethyl-2-ethoxy-4-amino benzoate.

7. An anticoccidial composition comprising a poultry feed having distributed therein an anticoccidial amount of a non-toxic acid addition salt of diethylaminopropyl-2-ethoxy-4-amino benzoate.

8. An anticoccidial composition comprising a poultry feed having distributed therein an anticoccidial amount of diethylaminoethyl-2-ethoxy-4-acetamido benzoate.

9. A poultry feed supplement composition that comprises a cereal having distributed therein a member of the class consisting of a compound of the formula

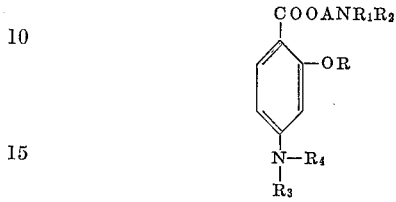

where R is selected from the class consisting of lower alkyl and lower alkenyl, A is lower alkylene, —$NR_1R_2$ is selected from the class consisting of diloweralkylamino, 1-piperidyl, 1-pyrrolidyl and 4-morpholinyl, $R_3$ and $R_4$ are selected from the class consisting of hydrogen, lower alkyl, lower alkanoyl, benzoyl and p-halobenzoyl, and non-toxic acid addition salts thereof.

10. The method of controlling coccidiosis in poultry that comprises administering to poultry susceptible to coccidiosis infection an anticoccidial amount of a member of the class consisting of a compound having the formula

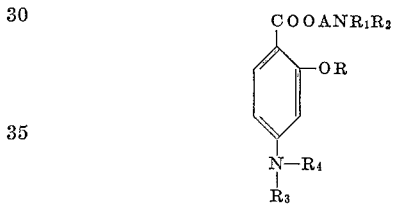

where R is selected from the class consisting of lower alkyl and lower alkenyl, A is lower alkylene, —$NR_1R_2$ is selected from the class consisting of diloweralkylamino, 1-piperidyl, 1-pyrrolidyl and 4-morpholinyl, $R_3$ and $R_4$ are selected from the class consisting of hydrogen, lower alkyl, lower alkanoyl, benzoyl and p-halobenzoyl, and non-toxic acid addition salts thereof.

References Cited by the Examiner

FOREIGN PATENTS 765,591   1/57   Great Britain.

OTHER REFERENCES

Husa: Pharmaceutical Dispensing, 3rd edition, 1947, Mack Printing Co., Easton, Pa., pages 18 and 19.

Jenkins: The Art of Compounding, 1957, McGraw-Hill Book Co., New York, N.Y., page 66.

Luduena: Archieves Internationales Pharmacodynamie, 1955, pages 17–26.

Ludena: Arch. Int. Pharmacodyn, 1955, pages 17, 18, 24–26.

Kalow: Journal of Pharmacol and Experimental Therapeutics, vol. 116, 1956, pages 418 and 419.

Veterinary Drug Encyclopedia, Ninth edition, 1961, Reuben Donnelley Corp., New York, N.Y. page 14.

JULIAN S. LEVITT, *Primary Examiner.*

MORRIS O. WOLK, LEWIS GOTTS, *Examiners.*